United States Patent
Smith

(10) Patent No.: US 6,586,030 B1
(45) Date of Patent: Jul. 1, 2003

(54) METHOD OF PRODUCING A SEASONED PRECOOKED MEAT PRODUCT

(75) Inventor: Gordon Lee Smith, Germanton, TN (US)

(73) Assignee: Sara Lee Corporation, Winston-Salem, NC (US)

(*) Notice: Subject to any disclaimer, the term of this patent is extended or adjusted under 35 U.S.C. 154(b) by 28 days.

(21) Appl. No.: 09/699,793

(22) Filed: Oct. 30, 2000

Related U.S. Application Data

(63) Continuation-in-part of application No. 09/128,457, filed on Aug. 4, 1998, now abandoned.

(51) Int. Cl.⁷ ................................ A23L 1/01; A23L 1/31
(52) U.S. Cl. ........................ 426/399; 426/506; 426/518; 426/523; 426/645
(58) Field of Search ............................... 426/281, 129, 426/641, 642, 644, 645, 646, 647, 518, 520, 523, 235, 243, 399, 506

(56) References Cited

U.S. PATENT DOCUMENTS

| | | | |
|---|---|---|---|
| 3,868,468 A | * 2/1975 | Tompkin et al. | 426/243 |
| 4,107,337 A | 8/1978 | Deppner, Jr. | 426/266 |
| 4,265,918 A | 5/1981 | Kueper et al. | 426/264 |
| 4,378,379 A | 3/1983 | Liesaus | 426/272 |
| 4,867,994 A | * 9/1989 | Perrine | 426/232 |
| H762 H | 4/1990 | DeMasi et al. | 426/112 |
| 4,935,282 A | 6/1990 | Pawlowski et al. | 428/121 |
| 4,957,756 A | * 9/1990 | Olander et al. | 426/243 |
| 5,489,443 A | 2/1996 | Knipe et al. | 426/264 |
| 5,997,925 A | * 12/1999 | Wilson et al. | 426/332 |
| 6,045,841 A | * 4/2000 | Singh et al. | 426/243 |

* cited by examiner

Primary Examiner—Nina Bhat
(74) Attorney, Agent, or Firm—Kilpatrick Stockton LLP

(57) ABSTRACT

A method of producing a seasoned precooked meat product, such as bacon, wherein the meat product is sized or sliced into individual unconnected units and thereafter heated to cook the individual units and thereby generate hot grease. A seasoning from a familiar grouping is then applied to the cooked meat product units so that it commingles with the hot grease and binds to the meat product units to provide an intense unique flavor commensurate with the meat seasoning with little negative visual impact. The flavored meat product units are then packaged, preferably in separated layers, within bags containing inert gases and thereafter rapidly frozen and stored.

18 Claims, 1 Drawing Sheet

Raw Belly Selection → Curing → Smoking → Sizing/Slicing → Heating, Cooking → Applying Seasoning → Packaging → Chilling

METHOD OF PRODUCING A SEASONED PRECOOKED MEAT PRODUCT

CROSS-REFERENCE TO RELATED APPLICATIONS

This is a continuation-in-part application of pending U.S. patent application Ser. No. 09/128,457, filed on Aug. 4, 1998 now abandoned.

FIELD OF THE INVENTION

The present invention relates to flavoring meat products and, more particularly, to a method of producing a seasoned precooked meat product with one of a number of well-known flavored seasonings.

DESCRIPTION OF THE PRIOR ART

Commercial preparation of precooked bacon for sale to consumers is done in two ways. The first way involves the use of two belt grills made of Teflon receiving the bacon as it is sliced for subsequent movement to the oven. Thus, slicing is on-line and the bacon is ready for packaging after cooking and cooling. The second procedure involves the use of industrial microwaves and a conveyor belt carrying sliced cured pork bellies through the microwave for complete cooking. Thereafter, the bacon slices are cooled and packaged.

Flavoring meat products such as bacon, has traditionally been accomplished by dissolving solid or liquid seasonings flavored like maple, hickory smoke, cajun and black pepper into the brine formulation, which was thereafter pumped into the green (raw) pork bellies. The process works similarly to putting sugar into iced tea. Only so much sugar can be absorbed in the tea, and only so much of the flavor can be absorbed in the solution for the pork bellies.

Another procedure historically used involves topical application of the seasoning on the raw whole bellies, after pumping, but before cooking. Unfortunately, this procedure also results in the loss of a significant level of flavoring during subsequent processing, slicing and cooking.

Thus, there is still a desire and need to impart a flavored seasoning to meat products, and particularly bacon, that can be retained with the product after it has been cooked and packaged for shipment and which will remain at a significant level within the meat product until the product is consumed and allow for novel meat flavoring combinations to be developed. It is to this need that the present invention is directed.

OBJECTIVES AND SUMMARY OF THE INVENTION

The purpose of the present invention, which will be described subsequently in greater detail, is to provide a method of uniquely flavoring a meat product such as bacon that has all of the advantages of prior art methods and more, and none of the disadvantages.

Another objective of the present invention is to provide a process for uniquely flavored precooked meat products.

A further objective of the present invention is to provide a process of the type described in which the flavored seasoning is applied to the cooked product and adheres thereto because of the grease, moisture or a combination of both resulting from the cooking process.

Yet another objective of the present invention is to provide a process of the type described that will enable the application of a flavored seasoning from the group including taco, salsa, chili, fajitas, teriyaki, cajun, caribbean, Italian, brown sugar, cinnamon sugar, maple, honey garlic, nacho, honey mustard, barbecue, cheese, chive and onion, sour cream and onion, and ranch, which, when combined with existing natural curing smoked meat flavor, will generate new hybrid flavors with substantial consumer appeal.

Yet still a further objective of the present invention is to provide a method of the type described which will enable the flavoring and packaging of meat products that will retain, at a high intensity, the flavoring until consumed and that will have an extended refrigerated shelf life of the flavor intensity.

These objectives are accomplished by the provision of a method of producing a seasoned precooked meat product, such as bacon, wherein the product is sized into individual, separate units, and heated to cook the meat product units and generate grease exudate. A selected seasoning is then applied to the meat product units to commingle and adhere to the grease and, thereafter, the cooked and seasoned units are packaged in anaerobic atmosphere bags. These flavored units can be frozen and maintained in a refrigerated condition for an extended period of time. The anaerobic packaging environment provides a substantial barrier to fat oxidation and the generation of off-flavors.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways. It is also to be understood that the phraseology and terminology employed herein are for the purpose of description and it should not be regarded as limiting in any respect. Those skilled in the art will appreciate that the concept upon which this disclosure is based may readily be utilized as a basis for designing other structures, methods and systems for carrying out the several purposes of this development.

It is important that the claims be regarded as including such equivalent methods and products resulting therefrom that do not depart from the spirit and scope of the present invention. The application is neither intended to define the invention of the application, which is measured by its claims, nor to limit its scope in any way. Thus, the objectives of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings, wherein like characters of reference designate like parts throughout the several views.

DESCRIPTION OF PREFERRED EMBODIMENT

Figure 1:
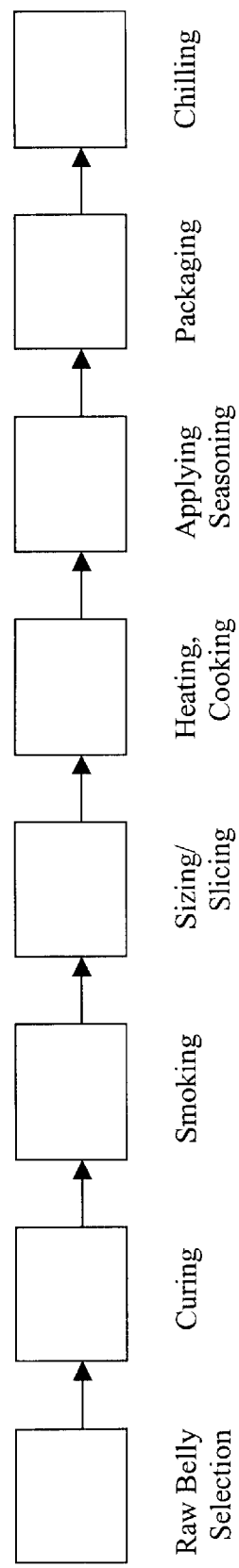
FIG. 1 is a block diagram setting forth the steps comprising the method of the present invention.

The method comprising the present invention is usable on commercial processes for cooking meat products, such as bacon. Pork bellies subjected to these commercial processes are commercially cured and smoked then sliced directly at the cooker.

Pork bellies are typically cured by injecting the pork belly with a brine solution. The brine solution is typically prepared by dissolving solid or liquid seasonings flavored, such as maple and hickory smoke, along with sodium erythorbates, sodium nitrite, salt or sugar, into the brine formulation. Government regulations limit the concentration of some ingredients that can be used in a brine solution. For example, the amount of sodium nitrite that can be used in a brine solution is limited to 120 parts per million (ppn) and the amount of sodium erythorbates is limited to 550 ppm. The quantity of ingredients that can be dissolved into solution is limited by physical chemistry in a manner similar to the idea that only so much sugar can be dissolved into iced tea. In addition, salt is a self-limiting ingredient as too much salt makes the bacon too salty.

After being injected with brine solution, the pork bellies are smoked in a manner known to those of ordinary skill in the art. For example, to smoke the pork bellies, raw pumped bellies are heated for three to five hours, during which natural smoke can be applied. An internal temperature of 124 to 128 degrees Fahrenheit is preferably reached, after which bellies are preferably quick chilled to 24 to 28 degrees Fahrenheit. Bacon slices may be a variety of thicknesses; however, a normal number of slices per pound of such meat ranges from 18 to 34 slices. The present invention will be described by utilizing pork bellies sliced into bacon; however, it is to be understood that the seasoning technique is usable on other pork products, such as sausage.

In the bacon example, the sizing step results from belly size selection and slicing, whereby pork bellies are cured (by the injection of brine containing curing agents, spices and possibly flavorings), smoked and thereafter sliced into strips of bacon prior to cooking. Thus, the sizing step can be accomplished at the beginning of the process with the belly weight and at slicing in terms of thickness.

The bacon slices are then introduced into the cooker and heated to a temperature of greater than 150 degrees Fahrenheit during which time the strips are cooked and hot grease is generated from the cooking process all over and around the product. A preferable heating range is from greater than 150 degrees to 190 degrees Fahrenheit, and more preferably, from 151 degrees Fahrenheit to 180 degrees Fahrenheit.

After the product is cooked, the product is then seasoned, preferably with a particulate seasoning. When a particulate seasoning is used, the product is preferably seasoned topically by a shaker. The weight of the particulate seasoning applied to the pork product units is preferably within the range of from 2% to 20% of the weight of the pork product units although other weight percentages of seasoning may be used. For example, 0.1 to 0.5 grams of particulate seasoning may be applied to slices of cooked bacon weighing from 5 to 6 grams. Examples of suitable seasonings include taco, chili, fajitas, cajun, caribbean, Italian, brown sugar, maple, honey garlic, nacho, barbecue, cheese, sour cream and onion, cinnamon sugar, salsa, honey mustard, chive and onion, and ranch. In other embodiments of the present invention, the seasoning may be in liquid form. Examples of liquid seasonings include soy sauce, Tabasco sauce, barbecue sauce, honey and maple syrup.

The seasoning is preferably applied shortly after the product is cooked. While the product may be cooled after cooking, the cooling is only for a short duration, preferably for less than twenty seconds, and more preferably for less than five seconds. Preferably, the seasoning is applied while the bacon is still warm, such that the grease has not solidified and can bond with the seasoning. A preferred temperature for applying the seasoning is within the range of from 120 degrees to 180 degrees Fahrenheit. This topical seasoning adds additional and unique flavoring far beyond the absorptive capabilities of a meat product injected with brine solution. In other words, the topical seasoning adds unique flavoring beyond what is possible through just injecting the pork belly with a solution during the curing step. The size of the cooked slices and the amount of seasoning applied may vary greatly depending on ingoing product size and slice weight. During cooling, the seasoning and grease bond across the cooked meat surface providing an appearance similar to the seasoned meat, except in cases where the seasoning levels are extremely high.

After application of the seasoning, the bacon slices are arranged on sheets of wax paper with 6 to 12 slices per sheet being a range of normally used quantities. However, other quantities can be used. Wax paper is a preferable carrier for the bacon slices as it is nonabsorbent and helps to hold and co-mingle the grease, moisture and seasoning. In one embodiment, five to thirty sheets of such products are thereafter stacked and positioned within bags, where they are gas flushed with nitrogen and/or carbon dioxide. After packaging, the bulk packages are frozen or refrigerated and stored in that condition. Consumer friendly packages might contain five to twenty slices per package, be vacuum packaged or modified atmosphere packaged, and placed in a carton or sleeve.

In another embodiment of the present invention, the bacon slices are arranged on sheets of wax paper before the application of the seasoning. In this embodiment, the placement operation preferably takes place at a temperature that will enable the seasoning to be applied while the bacon is still warm, such that the grease has not solidified and can bond with the seasoning. The placement operation preferably takes place when the bacon slices are at a temperature within the range of from greater than 120 degrees to 190 degrees Fahrenheit. After the bacon slices are seasoned, the products are thereafter stacked and positioned within bags, where they are gas flushed with nitrogen and/or carbon dioxide. After packaging, the bulk packages are frozen or refrigerated and stored in that condition. Consumer friendly packages might contain five to twenty slices per package, be vacuum packaged or modified atmosphere packaged, and placed in a carton or sleeve.

As previously mentioned, other higher fat content meat products are easily seasoned by the use of the present process. For example, sausage patties have been cooked to internal temperatures within the range of from 150 to 165 degrees Fahrenheit. Seasoning was applied immediately after cooking to the hot greasy surface (0.2–1.0 grams) and cooked weights for the sausage averaged 40 grams. Flavor retention upon reheating was extremely high.

From the foregoing, it will be understood that flavored meat products made in accordance with the present inventive method contained high flavor retention and allow for development of non-traditional hybrid flavored products. The process is efficient, economical, well-suited to common production methods, and susceptible to a wide latitude of variations as may be desirable in adapting the invention to different applications.

Consumer testing of standard and seasoned spicy bacon products incorporating the present invention concept against standard and seasoned regular bacon products showed a strong preference for both spicy bacon products among retail and foodservice customers. In an unbranded taste test utilizing conventional testing procedures to control bias and other variables, the spicy products scored decisively better than the standard products as reflected in the chart set forth below.

| | PREFERENCE | | | |
|---|---|---|---|---|
| | STANDARD REGULAR | SEASONED REGULAR | STANDARD SPICY | SEASONED SPICY |
| TOTAL Among | 3.5 | 1.9 | 3.8 | 1.4 |
| Retail Customers | 3.3 | 2.2 | 3.8 | 1.5 |
| Foodservice Customers | 3.7 | 1.8 | 3.8 | 1.3 |

Note: The lower rank order, the better. (Scale is 5 = poor, 1 = excellent).

| | FLAVOR | | | |
|---|---|---|---|---|
| | % Favorable Comments | | | |
| | STANDARD REGULAR | SEASONED REGULAR | STANDARD SPICY | SEASONED SPICY |
| Saltiness | 22 | 65 | 24 | 65 |
| Sweetness | 28 | 75 | 27 | 65 |
| Smoke | 20 | 68 | 20 | 70 |
| Heat (Spiciness) | N/A | N/A | 18 | 80 |
| Overall Flavor | 23 | 67 | 21 | 78 |

As can be seen, both spicy products tested were preferred and delivered significantly more flavor than standard products. Retail and foodservice respondents showed similar preference.

Although the invention has been described with reference to preferred embodiments, other embodiments can achieve the same results. Variations and modifications of the present invention will be obvious to those skilled in the art and it is intended to cover, in the appended claims, all such modifications at equivalent.

What is claimed is:

1. A method of producing a seasoned pork product comprising the steps of:
   injecting a pork product with flavored brine for curing;
   smoking the injected pork product;
   slicing the pork product into individual and separate units;
   heating the pork product units to cook the pork product units and generate hot grease, moisture or a combination of both on the surface of the pork product units;
   applying a particulate seasoning to the pork product units to commingle the hot cooking grease, moisture, or combination of both with the applied seasoning; and
   packaging the cooked and seasoned pork product units.

2. The method as claimed in claim 1, wherein cooking includes microwaving.

3. The method as claimed in claim 1, wherein the pork product is bacon.

4. The method as claimed in claim 1, wherein the pork product is sausage.

5. The method as claimed in claim 3, wherein the pork product units are heated to a temperature within the range of from 151 to 180 degrees Fahrenheit.

6. The method as claimed in claim 3, wherein the weight of the particulate seasoning applied to the pork product units is within the range of from 2 to 20% of the weight of the pork product units.

7. The method as claimed in claim 3, wherein the pork product units are heated to a temperature within the range of from 151 to 180 degrees Fahrenheit and the weight of the particulate seasoning applied to the pork product units is within the range of from 2 to 20% of the weight of the pork product units.

8. The method as claimed in claim 7, wherein packaging includes the further steps of arranging a predetermined quantity of pork product units on a wax paper blanket and positioning a predetermined number of pork product unit blankets in an airless bag.

9. The method as claimed in claim 1, wherein packaging includes the further steps of arranging a pre-determined quantity of pork product units on a wax paper blanket and positioning a pre-determined number of pork product unit blankets in an airless bag.

10. The method as claimed in claim 9, wherein packaging takes place at a temperature within the range of from 80 degrees to 100 degrees Fahrenheit.

11. The method as claimed in claim 9, wherein packaging takes place at a temperature within the range of from 20 degrees to 100 degrees Fahrenheit.

12. The method as claimed in claim 11, wherein the particulate seasoning is selected from the group consisting of taco, chili, fajitas, cajun, caribbean, Italian, brown sugar, maple, honey garlic, nacho, barbecue, cheese, sour cream and onion, cinnamon sugar, salsa, honey mustard, chive and onion, and ranch.

13. The method as claimed in claim 1, wherein the particulate seasoning is selected from the group consisting of taco, chili, fajitas, cajun, caribbean, Italian, brown sugar, maple, honey garlic, nacho, barbecue, cheese, sour cream and onion, cinnamon sugar, salsa, honey mustard, chive and onion, and ranch.

14. The method as claimed in claim 1, wherein the particulate seasoning is applied to the pork product units at a temperature within the range of from 120 degrees to 180 degrees Fahrenheit.

15. A method of producing a seasoned pork product comprising the steps of:
   injecting a pork product with flavored brine for curing;
   smoking the injected pork product;
   slicing the pork product into individual and separate units;
   heating the pork product units to cook the pork product units and generate hot grease, moisture or a combination of both on the surface of the pork product units;
   arranging a predetermined quantity of pork product units on a wax paper blanket;
   applying a particulate seasoning to the pork product units to commingle the hot cooking grease, moisture, or combination of both with the applied seasoning; and
   positioning a pre-determined number of pork product unit blankets in an airless bag.

16. The method as claimed in claim 15, wherein the pork product is bacon.

17. The method as claimed in claim 15, wherein the pork product units are arranged on the wax paper blanket when the bacon slices are at a temperature within the range of from greater than 120 degrees to 190 degrees Fahrenheit.

18. The method as claimed in claim 15, wherein the particulate seasoning is selected from the group consisting of taco, chili, fajitas, cajun, caribbean, Italian, brown sugar, maple, honey garlic, nacho, barbecue, cheese, sour cream and onion, cinnamon sugar, salsa, honey mustard, chive and onion, and ranch.

* * * * *